United States Patent [19]

Papp

[11] Patent Number: 4,902,117
[45] Date of Patent: Feb. 20, 1990

[54] CLOTHING IMAGE MIRROR PROJECTION SYSTEM

[75] Inventor: Endre K. Papp, Oakland, Calif.

[73] Assignee: Tryomatics, Inc., Los Angeles, Calif.

[21] Appl. No.: 240,544

[22] Filed: Sep. 6, 1988

[51] Int. Cl.$^4$ .......................... G02B 5/08; G03B 21/26
[52] U.S. Cl. ...................................... 350/601; 350/421;
    353/28; 353/37; 353/76; 353/77; 434/371
[58] Field of Search ........................ 350/420, 601, 421;
    353/28, 30, 37, 77, 76; 434/371

[56] References Cited

U.S. PATENT DOCUMENTS

| | | | |
|---|---|---|---|
| 2,061,378 | 11/1936 | Henze et al. | 353/28 |
| 3,507,570 | 4/1970 | Bourdier et al. | 353/28 |
| 3,924,933 | 12/1975 | Hirose | 350/181 |
| 4,017,160 | 4/1977 | Betensky | 350/182 |
| 4,059,343 | 11/1977 | Kowalski et al. | 350/182 |
| 4,605,294 | 8/1986 | Bourdier et al. | 353/28 |

FOREIGN PATENT DOCUMENTS

0095328  5/1986  Japan ................................ 353/95

Primary Examiner—Bruce Y. Arnold
Assistant Examiner—R. D. Shafer
Attorney, Agent, or Firm—Allan J. Jacobson

[57] ABSTRACT

A clothing image mirror projection system for producing a composite image of an article of clothing superimposed upon the reflected image of a viewer's face includes a two-way mirror, a rear projection screen, and apparatus for projecting an image of an article of clothing onto said rear projection screen. The present system includes an anamorphic lens assembly to adjust the dimensions of the clothing image along a horizontal axis. Further, the present system includes means by which the height and weight of the subject are measured by sensors, and used to automatically adjust the height and width of the clothing image so as to fit the height and general size of the subject viewer.

6 Claims, 6 Drawing Sheets

CLOTHING IMAGE MIRROR PROJECTION SYSTEM

FIELD OF THE INVENTION

This invention is related to the field of optical systems arranged for viewing a composite image. In particular, this invention is related to the field of optical systems in which the image of an article of clothing is projected to the rear of a two-way mirror. A viewer in front of the two-way mirror observes a composite image of the clothing and the viewer.

BACKGROUND OF THE INVENTION

Systems for projecting an image of an article of clothing for viewing through a two-way mirror are known. For example, U.S. Pat. No. 3,507,570 to Bourdier et.al. shows a composite optical display system which permits a seated viewer to observe himself or herself in a two-way mirror as though wearing a projected image of an article of clothing. Behind the two-way mirror, the clothing image is projected onto a screen. In front of the two-way mirror, ambient light is reduced while the face of the subject is specifically illuminated in order to enhance the effect of the composite image. In this manner, a viewer may observe himself or herself wearing each of a successive series of articles of clothing, without having to actually try on each article of clothing.

Further, U.S. Pat. No. 4,605,294 to Bourdier et. al. shows another clothing image display system which permits a standing viewer to observe himself or herself through a two-way mirror as though wearing a projected image of an article of clothing. In addition, mechanical means for adjusting the height and/or width of the clothing image to fit the general size of the viewer is shown. Specifically, a flexible mirror is disclosed for adjusting the image width. However, the disclosed mechanical systems are complex and subject to failures. Furthermore, in the prior art, the image size and width is adjusted manually by the viewer or by an assistant using remote controls to adjust the appropriate respective mechanism.

SUMMARY OF THE INVENTION

The present invention is embodied in a clothing mirror image projection system which includes an anamorphic lens assembly to adjust the dimensions of the image along a horizantal axis. Specifically, counter rotating prism lenses are included to magnify or reduce the dimensions of the image along a horizontal axis.

A further aspect of the present invention is embodied in a clothing image mirror projection system in which the height and weight of the subject are automatically measured by sensors. Thereafter, the height and weight measurements from the sensors are used to automatically adjust the height and width of the clothing image so as to fit the height and general size of the subject viewer. Specifically, height is measured by sonar emitters and sensors located at the top of the viewer's booth in front of the two-way mirror. The weight of the viewer is measured by a pressure sensitive mat located in front of the mirror where the subject normally stands. Height of the image is set to correspond to the height measured by the sonar emitter and sensor. The height to weight ratio of the veiwer is then computed and the width of the image set to correspond to the computed height to weight ratio.

A still further aspect of the present invention is embodied in a means for correcting the trapezoidal distortion caused when a projected image is reflected from an angled mirror. Such trapezoidal distortion is corrected by fixing the projected image on a rear projection screen which is placed at a compensating angle to the reflecting mirror.

DETAILED DESCRIPTION

Figure 1:
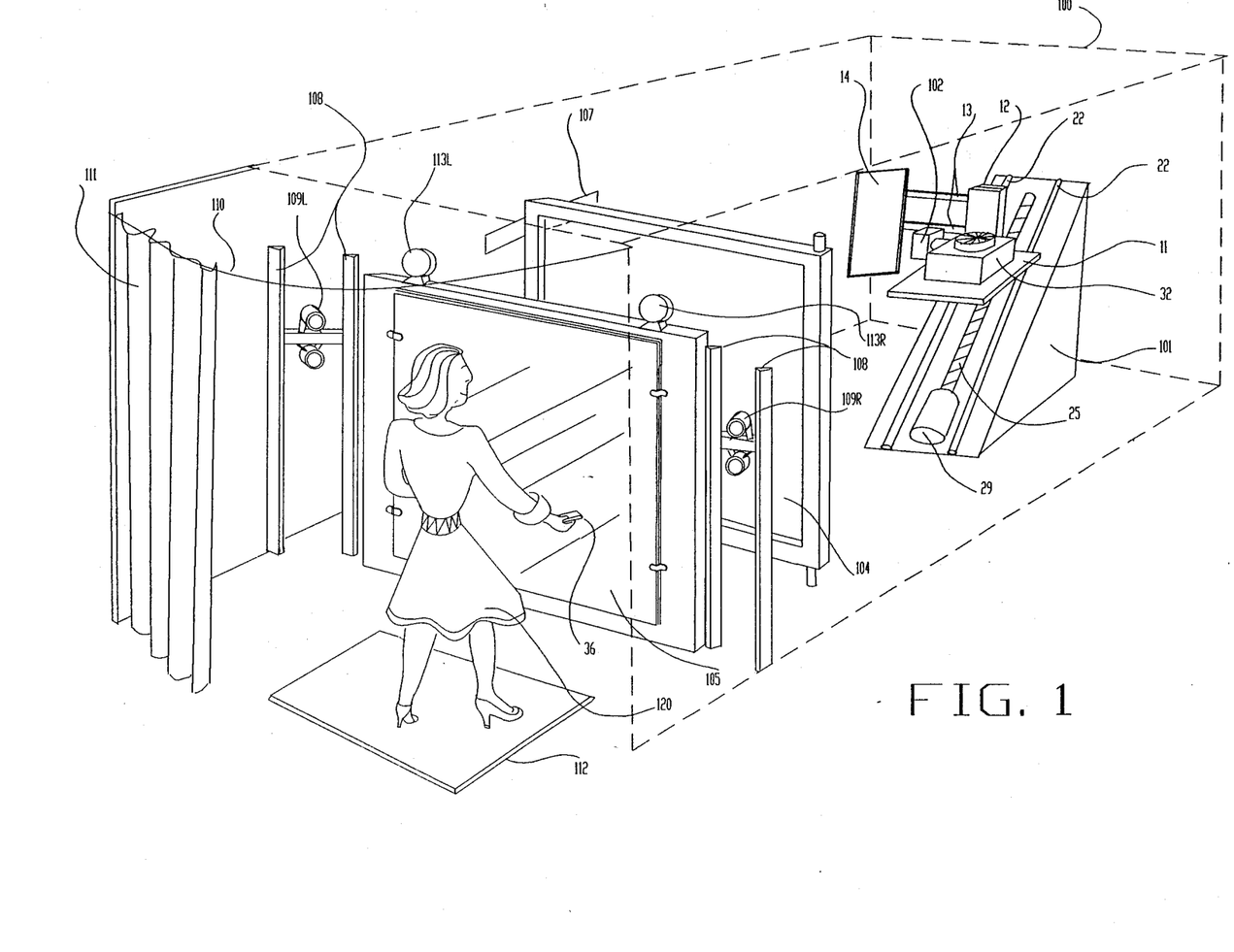
FIG. 1 is an isometric diagram of a clothing image mirror projection system using an anamorphic lens assembly in accordance with the present invention.
Figure 2:
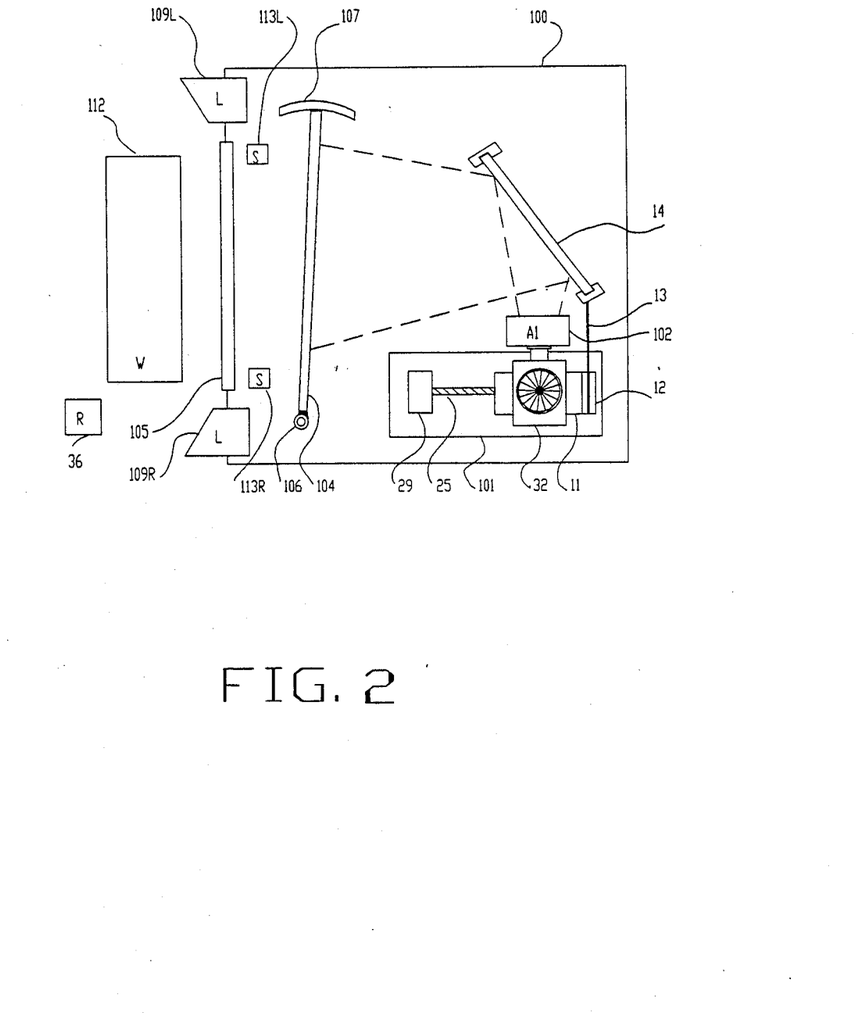
FIG. 2 is a schematic diagram of a clothing image mirror projection system using an anamorphic lens assembly in accordance with the present invention.

A clothing image mirror projection system, as shown in FIG. 1 in isometric form, and as shown in FIG. 2 in schematic form, includes an enclosure 100 and a viewing booth defined by rail 110 and curtain 111. On the front face of the enclosure 100 opposite the viewer is a two-way mirror 105 with its reflective side facing the viewer.

Above the two-way mirror and to either side of the viewer 120, are two sonar sensors. A left sonar sensor 113L and a right sonar sensor 113R are provided. Each sonar sensor includes a sonar emitter and a sonar receiver of the type available from Polaroid Corporation, Cambridge Mass.

To either side of the viewer are left and right lights 109L and 109R respectively which are intended to illuminate the face of the viewer 120. Lights 109L and 109R are slideably mounted on rails 108 and moveable by respective electric motors so as to be adjustable according to the height of the viewer.

Within enclosure 100, opposite the transmissive side of the two-way mirror 105, is a rear projection screen 104 slideably mounted on rails 106 which pivot at one end thereof. At the other end of rails 106, rear projection screen 104 is connected to an adjustable bracket assembly 107 by which the angle of rear projection screen 104 may be adjusted.

Behind rear projection screen 104 is an image projection assembly which includes a slide projector 32 situated on a table 11 which is slideably mounted on a pair of rails 22. Table 11 is coupled to a lead screw 25 which is driven by electric motor 29. Also, a flat mirror 14 is connected to table 11 through rigid tubular members 13 and mounting block 12. Also mounted on table 11 in front of the beam of light which is projected light from projector 32 is an anamorphic lens assembly 102.

Thus, projector 32, anamorphic lens assembly 102, and mirror 14 essentially comprise a single assembly which moves along with table 11 as it slides on rails 22.

In operation, a viewer 120 steps into position on the pressure sensitive mat 112. Remote control 3 includes means for turning on projector 32. A projected image from projector 32 passes through anamorphic lense assembly 102, is then reflected from mirror 14 and fixed as an image on rear projection screen 104. The image formed on rear projection screen 104 is visible to the viewer through two-way mirror 105. Also, since lights 109L and 109R illuminate the face of the viewer, a composite image of the projected article of clothing and the viewer's face is thereby formed.

In the manual mode, the viewer may adjust the height and width of the projected image of the article of clothing using control buttons provided on remote control 36. In the automatic mode, described below, the height and width of the projected image are automatically adjusted so that the viewer need only to step into position on the pressure sensitive mat 112.

Image height adjustment is effected by activating motor 29 which drives lead screen 25 which in turn causes table 11 to slide along rails 22 mounted on ramp 101. As table 11 moves down the ramp 101 in a direction closer to rear projection screen 104, the projected image becomes smaller. Conversely, as table 11 moves up the ramp 101 in a direction away from rear projection screen 104, the received image becomes larger. In both cases, due to the incline of rails 22 along a prescribed ramp 101, the bottom of the projected image on projector screen 104 remains stationary, appearing at the feet of the viewer, while the height, or distance from the feet to the neck of the projected image, becomes larger or smaller, as the case may be.

Also, whenever motor 29 is activated, the electric motors coupled to lights 109L and 109R are also activated so that the illumination of the viewer's face will track the adjustment of the image height. Note that since mirror 14 is placed at an angle to projector 32, the reflected projected image therefrom will suffer from a certain degree of trapezoidal distortion. In order to compensate for such trapezoidal distortion, adjustable brackets 107 are provided. By proper adjustment of bracket 107, rear projector screen 104 is positioned at an angle relative to mirror 14 so as to produce a compensating trapezoidal distortion opposite to that produced by mirror 14. In such manner, the trapezoidal distortion can be partially or substantially eliminated.

Alternatively, mirror 14 could be eliminated by directly projecting the image from projector 32 on to rear projector screen 104. Although such system would require an anamorphic lens assembly capable of handling a wider angle projected image, the trapezoidal distortion would be substantially eliminated, and rear projector screen 104 may be positioned parallel to two-way mirror 105.

The image width is adjusted by the use of an anamorphic lens assembly 102. In manual mode, the anamorphic lens assembly 102 is controlled by the viewer through buttons provided on remote control 36. In automatic mode, the anamorphic lens assembly 102 is automatically adjusted so as to set the image width according to the height to weight ratio of the viewer.

Figure 3:
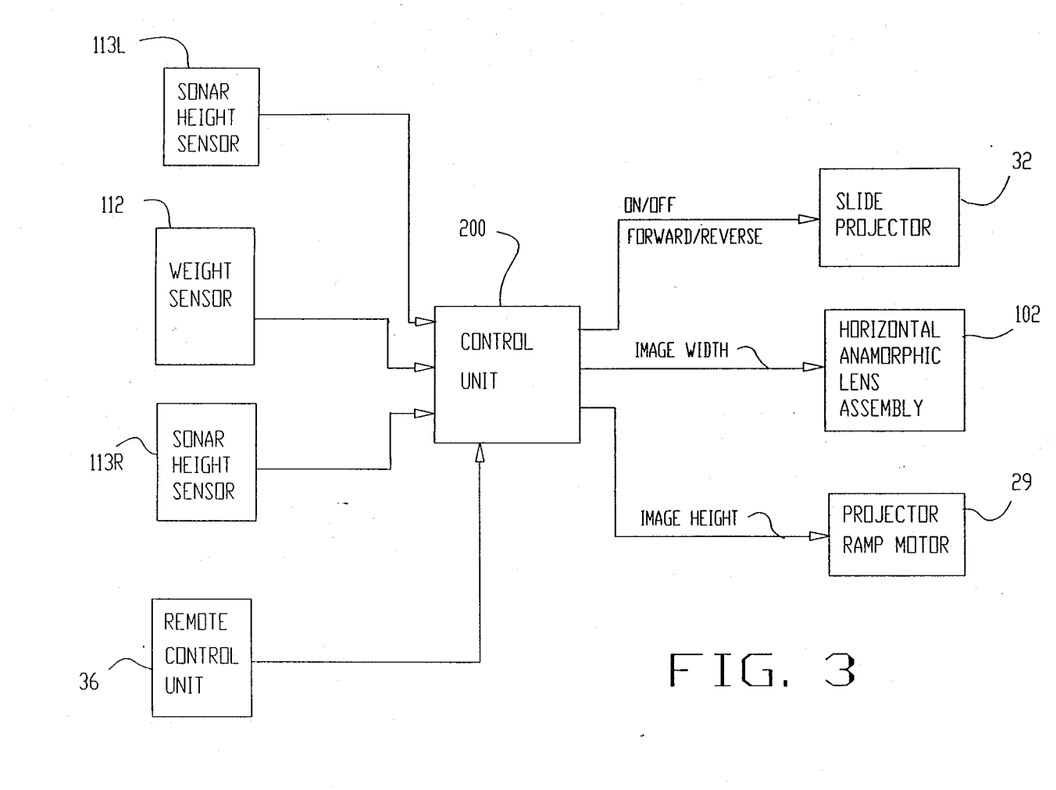
FIG. 3 is a block diagram of a clothing image mirror projection system in accordance with the present invention.

FIG. 3 shows a block diagram of the clothing image mirror projection system. A central control unit 200, which may be a dedicated mircroprocessor or a general purpose personal computer, is programmed to coordinate control of the projected image height and width in accordance with the system inputs.

The system inputs to control unit 200 are the left and right sonar height sensors 113L and 113R, the pressure sensitive mat or weight sensor 112, and remote control unit 36. Control unit 200 includes outputs to control the slide projector 32 on/off and forward/reverse functions. Also, control unit 200 controls the image width by an output signal to the anamorphic lens assembly 102. Similarly, image height is adjusted by an output signal from control unit 200 which activates ramp projector motor 29.

Figure 4:
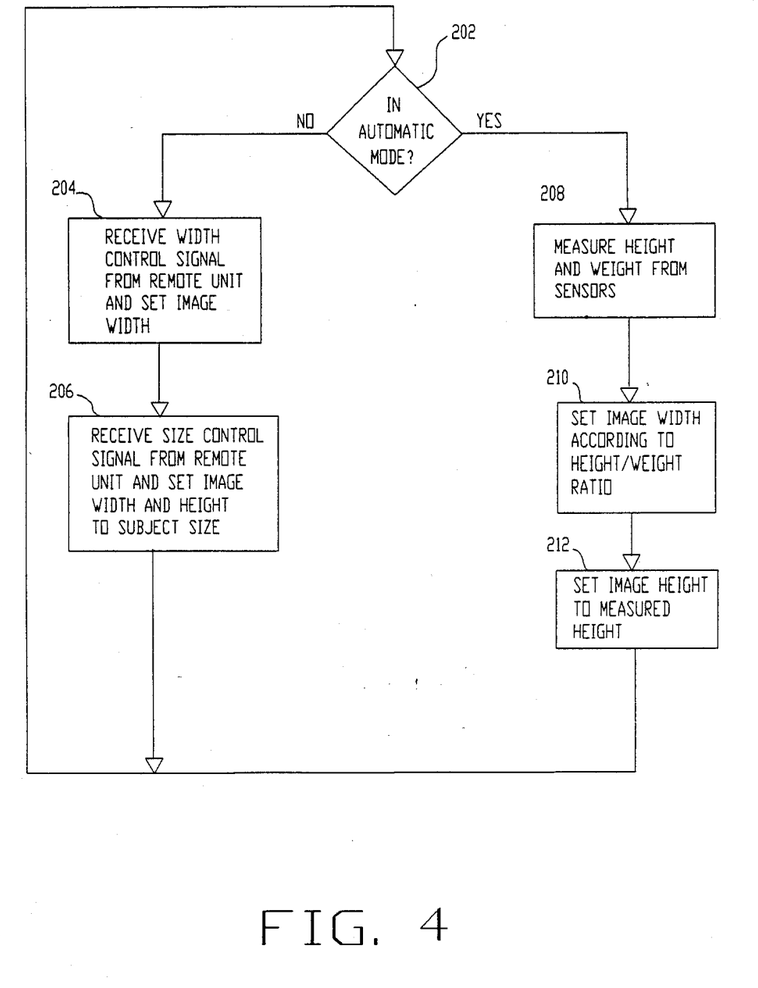
FIG. 4 is a flow chart diagram illustrating the computer program for the control unit of FIG. 3.

FIG. 4 is a flow chart diagram illustrating the control program contained in control unit 200. First, it is determined whether or not the system is in automatic or manual mode at step 202. In manual mode, control unit 200 receives a width control signal from remote control unit 36, and acts according to that signal to set the image width at step 204 by an output signal to anamorphic lens assembly 102. Also, in a continuous real time fashion, remote control unit 200 receives a height control signal from remote control unit 36 and acts accordingly to that signal to set the image height at step 206 accordingly.

In automatic mode, the height and weight of the viewer are measured from respective sensors at step 208. The left sonar sensor 113L and right sonar sensor 113R provide respective measured distances to the subject. By triangulation of these two measured distances, the height of the viewer is determined. The weight of the viewer is determined by the input from weight sensor 112. The height to weight ratio of the viewer is computed at step 210 and the width of the image then set according to the computed height to weight ratio by activation of anamorphic lens assembly 102. At step 212, the image height is set to correspond to the measured height by activation of the projector ramp motor 29. Both height and weight settings are carried out in a continuous, real time fashion.

Figure 5:
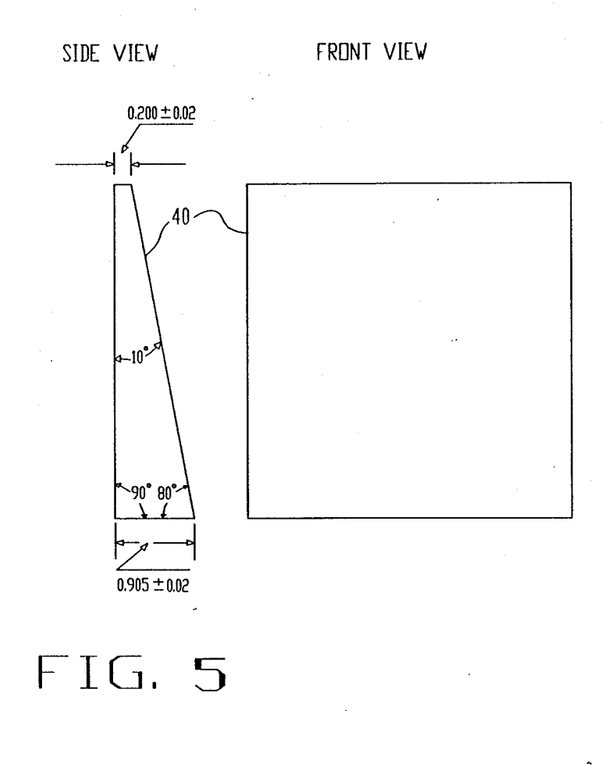
FIG. 5 shows a prismatic lens which is utilized in the anamorphic lens assembly in a clothing image mirror projection system of the present invention.

Anamorphic lens assembly 102 includes a pair of wedge prisms one of which is shown in FIG. 5. Wedge prism 40 is of a generally rectangular shape as shown in the front view of FIG. 5. From the side view in FIG. 5, it can be seen that wedge prism 40 has a ten degree angle between prism faces. Table 1 of FIG. 5 contains the optical specifications used to fabricate wedge prism 40.

Figure 6A:
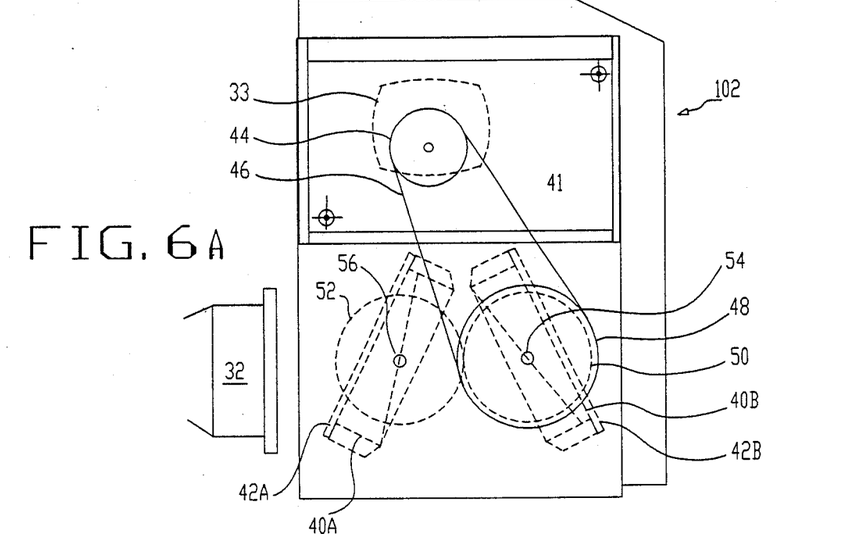
FIGS. 6A, 6B, and 6C show an anamorphic lens assembly used to respectively magnify, transmit unaltered, or reduce the dimensions of an image along a horizontal axis used in a clothing image mirror projection system of the present invention.

FIG. 6A shows a pair of wedge prisms 40A and 40B in an anamorphic lens assembly 102, which is provided for adjusting the width of the projected image. Wedge prisms 40A and 40B are held in place by respective rectangular frames 42A and 42B. Frame 42A is arranged to privotally rotate about axis 56 which is coupled to gear 52.

Similarly, frame 42B is arranged to pivotally rotate about axis 54 which is coupled to gear 50. Gears 50 and 52 are arranged to engage each other so that the rotation of one prism will cause the counter rotation of the other.

Gear 50 is coupled to a pulley wheel 48 along axis 54. Engaging pulley wheel 48 is a pulley 46 coupled to pulley wheel 44 which is driven by electric motor 33. The prism lenses 40A, 40B and associated components are contained in a housing 41 which has openings on either side thereof to permit a projected light beam to pass therethrough. The openings may also be transparent walls. Projector 32 is positioned adjacent to one of the openings in housing 41 so that its projected image will pass through prism lens 40A and prism lens 40B and then out the other opening in housing 41.

In operation, the anamorphic lens assembly 102 is used to adjust the dimensions of the projected image in a horizontal direction i.e., to adjust the width of the projected image. A prism lens causes a spreading or a contraction of the light beams passing through such lens, depending upon the angle of the prism and the angle of the incident light rays. Further, the spreading or contraction effect of prism lenses 40A and 40B is additive. However, due to the opposite symetrical relative orientation of the two prism lenses, there is no shift of the projected image, as there would be from the use of a single prism lens. Therefore, the disclosed prism lens arrangement produces a spreading i.e., an angle magnification (or reduction) along one dimension of a projected image passing through such prism lens assembly.

When motor 33 is activated, prisms 40A and 40B counter rotate with respect to each other, which will adjust the width of the projected article of clothing image. FIG. 6A shows prisms 40A and 40B in a position so as to magnify the width of the image projected from projector 32.

Figure 6B:
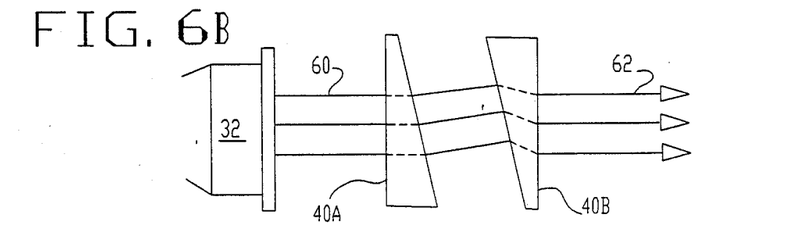

When the counter rotating prisms 40A and 40B are substantially parallel, as shown in FIG. 6B, the image from projector 32 is transmitted substantially unaltered. That is, the angle of projection of rays 60 entering prism 40A is substantially equal to the angle of projection of rays 62 eminating from prism 40B.

Figure 6C:
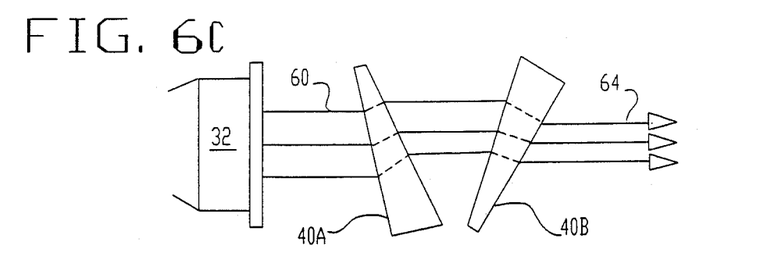

Further counter rotation of the prisms 40A and 40B will result in reduction of the projected image. This condition is illustrated in FIG. 6C, in which the angle of the projected rays 64 is less than the angle of the rays 60 from projector 32. Thus, activation of motor 33 results in the distortion of the projected image along a horizontal axis.

Although motor 33 is shown coupled to the counter rotating prism lenses via a pulley system it will be understood that the motor may also be arranged to directly drive one of the two gears 50 or 52.

What is claimed is:

1. A system for providing a composite image of a projected image of an article of clothing and a superimposed reflected image of a viewer's face, said system comprising:
   a projector arranged for projecting photographic images of a plurality of said articles of clothing;
   a projector screen positioned for receiving said projected photographic images of said plurality of articles of clothing;
   a two-way mirror having respective reflective and transmissive surfaces, said two-way mirror positioned adjacent to said projector screen and disposed with said transmissive surface thereof facing said projector screen whereby a viewer positioned opposite to said reflective surface of said two-way mirror is able to view a composite image of said projected image of an article of clothing and the reflected image of said viewer in said two-way mirror; and
   an anamorphic lens assembly having means for adjusting the linear dimensions of said projected photographic image of an article of clothing along an axis substantially parallel to the plane of said projected photographic image of an article of clothing, said anamorphic lens assembly being positioned between said projector and said projector screen.

2. A system for providing a composite image of a projected image of an article of clothing and a superimposed reflected image of a viewer's face, said system comprising:
   a projector arranged for projecting photographic images of a plurality of said articles of clothing;
   a projector screen positioned for receiving said projected photographic images of said plurality of articles of clothing;
   a two-way mirror having respective reflective and transmissive surfaces, said two-way mirror positioned adjacent to said projector screen and disposed with said transmissive surface thereof facing said projector screen whereby a viewer positioned opposite to said reflective surface of said two-way mirror is able to view a composite image of said projected image of an article of clothing and the reflected image of said viewer in said two-way mirror; an anamorphic lens assembly having means for adjusting the linear dimensions of said projected photographic image of an article of clothing along an axis substantially parallel to the plane of said projected photographic image of an article of clothing, said anamorphic lens assembly being positioned between said projector and said projector screen;
   wherein said anamorphic lens assembly comprises first and second pivotally mounted prism lenses, and means for rotating said first and second prism lenses whereby one of said first and second prism lenses rotates clockwise and the other of said first and second prism lenses rotates counter clockwise; and
   said system further comprises remotely operable control means for rotating said first and second prism lenses whereby the width of said projected photographic image is thereby adjustable.

3. A system in accordance with claim 2, wherein said means for rotating said first and second prism lenses comprises: first and second frames arranged for holding said first and second prism lenses respectively;
   a housing having openings at two sides thereof for transmitting a projected image therethrough;
   means for privotally mounting said first and second frames within said housing;
   an motor operable from said remote control means; and
   means coupling said motor to said first and second frames for rotating said first and second prism lenses.

4. A system for providing a composite image of a projected image of an article of clothing and a superimposed reflected image of a viewer's face, said system comprising:
   a projector arranged for projecting photographic images of a plurality of said articles of clothing;
   a projector screen positioned for receiving said projected photographic images of said plurality of articles of clothing;
   a two-way mirror having respective reflective and transmissive surfaces, said two-way mirror positioned adjacent to said projector screen and disposed with said transmissive surface thereof facing said projector screen
   whereby a viewer positioned opposite to said reflective surface of said two-way mirror is able to view a composite image of said projected image of an article of clothing and the reflected image of said viewer in said two-way mirror; and means for automatically measuring the height of the viewer and adjusting the height of said projected photographic image of said article of clothing, said automatic measuring and adjusting means comprising:
- non-contact height measuring means for measuring the height of said viewer and having an output signal corresponding to the height of said viewer;
- means for adjusting the height of said projected photographic image of said article of clothing on said projector screen; and
- means coupling said output signal from said non-contact height measuring means to said means for adjusting the height of said projected photographic image of said article of clothing on said projector screen.

5. A system in accordance with claim 4, wherein said non-contact height measuring means includes a sonar sensor, having a sonar emitter and a sonar receiver, mounted at a fixed point generally above said viewer for determining the distance from said viewer to said fixed point above said viewer, to thereby provide an indication of the measured height of said viewer.

6. A system for providing a composite image of a projected image of an article of clothing and a superimposed reflected image of a viewer's face, said system comprising:
- a projector arranged for projecting photographic images of a plurality of said articles of clothing;
- a projector screen positioned for receiving said projected photographic images of said plurality of articles of clothing;
- a two-way mirror having respective reflective and transmissive surfaces, said two-way mirror positioned adjacent to said projector screen and disposed with said transmissive surface thereof facing said projector screen whereby a viewer positioned opposite to said reflective surface of said two-way mirror is able to view a composite image of said projected image of an article of clothing and the reflected image of said viewer in said two-way mirror; an anamorphic lens assembly having means for adjusting the linear dimensions of said projected photographic image of an article of clothing along an axis substantially parallel to the plane of said projected photographic image of an article of clothing, said anamorphic lens assembly being positioned between said projector and said projector screen;
- means for adjusting the height of said projected photographic image of said article of clothing on said projector screen;
- means for automatically measuring the height of the viewer and adjusting the height of said projected photographic image of said article of clothing, said means comprising:
  - height measuring means for measuring the height of said viewer and having an output signal corresponding to the height of said viewer; and
  - means coupling said output signal from said height measuring means to said means for adjusting the height of said projected photographic image of said article of clothing on said projector screen; and
- automatic means for measuring the weight of said viewer and adjusting the width of said projected photographic image of said article of clothing, said automatic means comprising:
  - a weight sensor positioned below said viewer opposite to said reflective surface of said two-way mirror;
  - means for computing the height to weight ratio of said viewer wherein said height is measured by said height measuring means and said weight is measured by said weight sensor; and
  - means coupled to said anamorphic lens assembly for adjusting the width of said projected image of said article of clothing in accordance with said computed height to weight ratio.

* * * * *